W. A. CAMPBELL.
STEERING GEAR FOR AUTOMOBILES.
APPLICATION FILED OCT. 21, 1911.

1,084,844.

Patented Jan. 20, 1914.

INVENTOR
W. A. Campbell
BY
F. M. Wright
ATTORNEY

UNITED STATES PATENT OFFICE.

WILLIAM A. CAMPBELL, OF MARICOPA, CALIFORNIA.

STEERING-GEAR FOR AUTOMOBILES.

1,084,844.  Specification of Letters Patent.   Patented Jan. 20, 1914.

Application filed October 21, 1911. Serial No. 655,976.

*To all whom it may concern:*

Be it known that I, WILLIAM A. CAMPBELL, a citizen of the United States, residing at Maricopa, in the county of Kern and State of California, have invented new and useful Improvements in Steering-Gear for Automobiles, of which the following is a specification.

The present invention relates to improvements in steering apparatus for motor vehicles, the object of the invention being to provide an apparatus, whereby the front wheels of the vehicle, in turning to direct the vehicle to the right or left, will also be moved out of a vertical plane, thereby preventing skidding, effecting a saving on the wheel tires and on the power used to propel the vehicle, and rendering the vehicle less apt to turn over.

Figure 1:
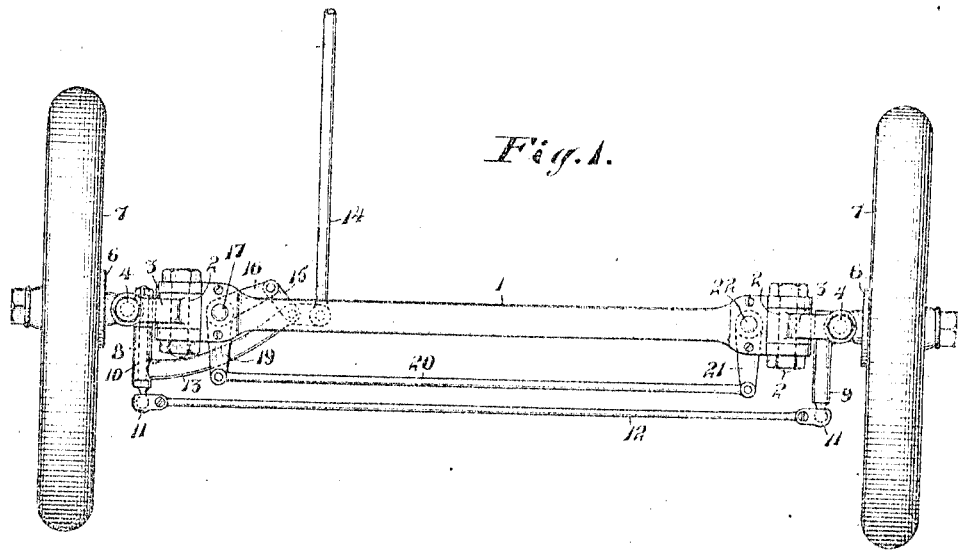
Figure 2:
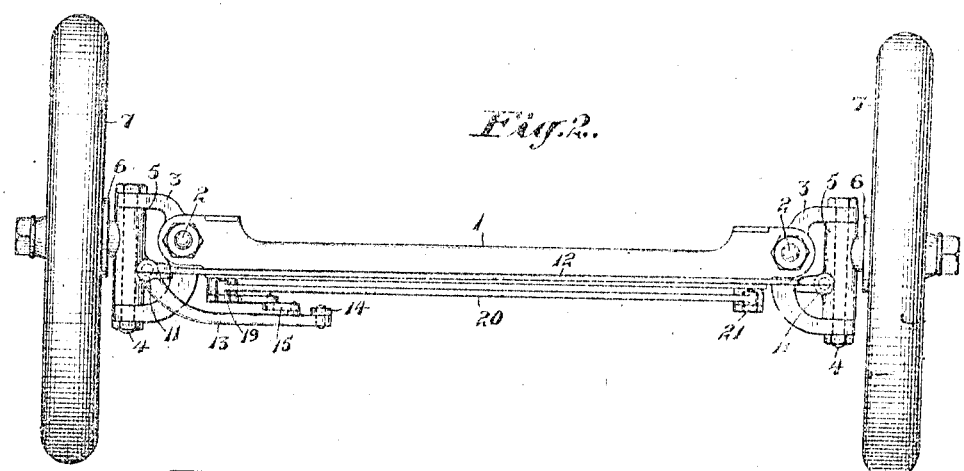
Figure 3:
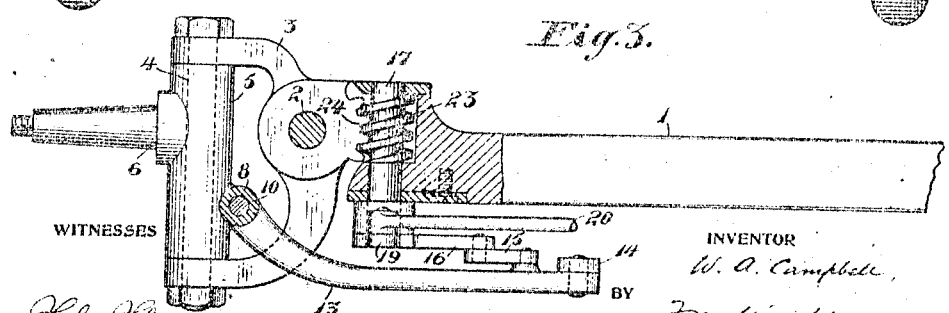

In the accompanying drawing, Figure 1 is a plan view of the steering apparatus of an automobile constructed in accordance with my invention; Fig. 2 is a front view thereof; Fig. 3 is an enlarged detail sectional view of a portion thereof.

Referring to the drawing, 1 indicates the front axle of a motor vehicle having forked ends, in each of which is secured a horizontal shaft 2, on which is pivoted between the fork members, a vertical yoke 3, between the ends of which is secured a vertical shaft 4, on which is pivoted a sleeve 5, from which extends a spindle 6 carrying a front wheel 7. From said sleeves 5 extend forwardly arms 8, 9, of which the arm 8 is tubular and contains a rod 10. Connected by ball and socket joints 11 with the front ends of said rod 10 and of the other arm 9 respectively is a link 12, said link thus forming a connection between said sleeves 5, whereby, when either of them is turned about a vertical axis, the other is similarly turned. This turning is effected by means of an arm 13 rigidly connected to the tubular arm 8, the outer end of which arm 13 is pivotally connected to the steering rod 14. Pivotally connected to said arm 13, at a point adjacent to its connection with the steering rod 14, is one end of a link 15, the other end of which is connected to a crank arm 16, which is attached to a vertical shaft 17, having bearings in the adjacent terminal portion of the axle 1. Said crank arm is extended at an angle past its connection with the shaft 17 to form another crank arm 19, the outer end of which is connected by a link 20 with an outer end of a similar crank arm 21, the inner end of which is connected to the lower end of a vertical shaft 22 precisely similar to the shaft 17 and similarly arranged in the other terminal portion of the axle 1. Said shafts 17 and 22 extend through recesses in the ends of said axle and are therein formed with worms 23 which engage the teeth of segmental gear wheels 24 formed upon the yokes 3.

The following is the mode of operation of my improved steering apparatus: Supposing that it is desired to steer the motor vehicle to the right, then the steering rod 14 is moved forward causing the arm 13 and the sleeve 5 to turn in a right-handed direction in Fig. 1, so that the front portion of the wheel also turns to the right. But since the outer portion of the arm 13, connected with the steering rod, is moved forwardly, the link 15 is also moved forwardly, and the shaft 17 is turned in a right hand direction in Fig. 1. Referring to Fig. 3 it will be seen that such a movement of the shaft 17 causes the segment gear to turn in a left-handed direction, viewed as in Fig. 3, and therefore the yoke, and the spindle carried thereby, to move downwardly. Thus the plane of the wheel is turned, not only about a vertical axis as in steering, but also about a horizontal axis. By reason of the link connection between the shafts 17 and 22, precisely the same action takes place with both wheels.

Several advantages result from this construction. There is less danger of skidding, a saving is effected on the wheel tires and of the driving power, and the machine is not so apt to turn over when making sharp turns.

It will be observed that the worm 23 not only transmits motion to the segment gear 24 when it is desired to turn the vehicle, but also acts as a locking device to positively lock the wheel and prevent it turning out of its plane of rotation, when it is not desired to turn the vehicle.

I claim:—

1. In combination with a steering wheel, a spindle upon which said steering wheel is rotatably mounted, a yoke, a shaft pivoted in the ends of said yoke and carrying said spindle, a wheel axle, a horizontal shaft in the end of said wheel axle on which said yoke is pivoted to swing vertically, a segment gear connected to said yoke, a vertical worm shaft rotatably mounted in said end of the wheel axle and meshing with said segment gear, and an operative connection between said spindle-carrying shaft and worm shaft, whereby they turn in unison.

2. In combination with a steering wheel, a spindle upon which said steering wheel is rotatably mounted, a yoke, a shaft pivoted in the ends of said yoke and carrying said spindle, a wheel axle, a horizontal shaft in the end of said wheel axle on which said yoke is pivoted to swing vertically, a segment gear connected to said yoke, a vertical worm shaft rotatably mounted in said end of the wheel axle and meshing with said segment gear, an arm extending forwardly from said spindle-carrying shaft, an arm extending laterally from said first-named arm, a crank arm extending from said worm shaft, a link connecting said arms, and means for moving one of said arms.

3. The combination of a rigid wheel axle, forked at both ends, a horizontal shaft having its bearing in the members of each fork, a yoke mounted upon each shaft between said fork members and having gear teeth, an upwardly extending shaft connecting the ends of each yoke, a sleeve around each of said latter shafts, a spindle extending outwardly from each sleeve, a wheel on each spindle, a steering rod, an arm for transmitting motion from said steering rod to the sleeve to turn the latter, a shaft rotatably mounted in each end of the wheel axle, a rotary device mounted on said shaft and engaging said gear teeth to turn the same, an arm extending from said shaft, a rod operatively connected to both of said latter arms whereby they move in unison, and an operative connection from the aforesaid arm to one of said latter arms, a rod operatively connected to both of said sleeves whereby they move in unison.

In testimony whereof I have hereunto set my hand in the presence of two subscribing witnesses.

WILLIAM A. CAMPBELL.

Witnesses:
  CHAS. A. BARNHART,
  J. P. SHIFFERS.